(No Model.) 4 Sheets—Sheet 2.
J. P. DESCALZO.
COMBINED HARVESTER AND THRASHER.

No. 350,667. Patented Oct. 12, 1886.

Witnesses.
Elihu P. Stowe
Alfred B. Treadwell

Inventor,
Joseph P. Descalzo.
By J. B. Webster
Att'y.

(No Model.) 4 Sheets—Sheet 3.
J. P. DESCALZO.
COMBINED HARVESTER AND THRASHER.
No. 350,667. Patented Oct. 12, 1886.
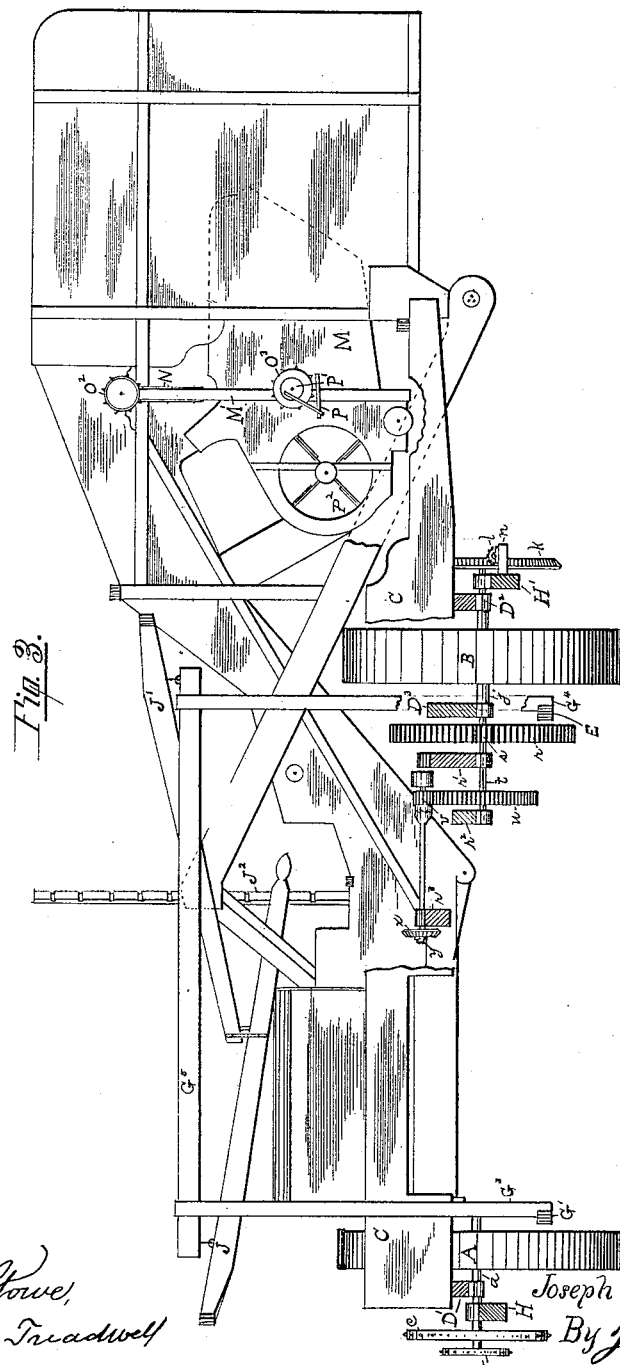
Witnesses
Ethw P. Stowe,
Alfred B. Treadwell
Inventor.
Joseph P. Descalzo.
By J. B. Webster,
Att'y.

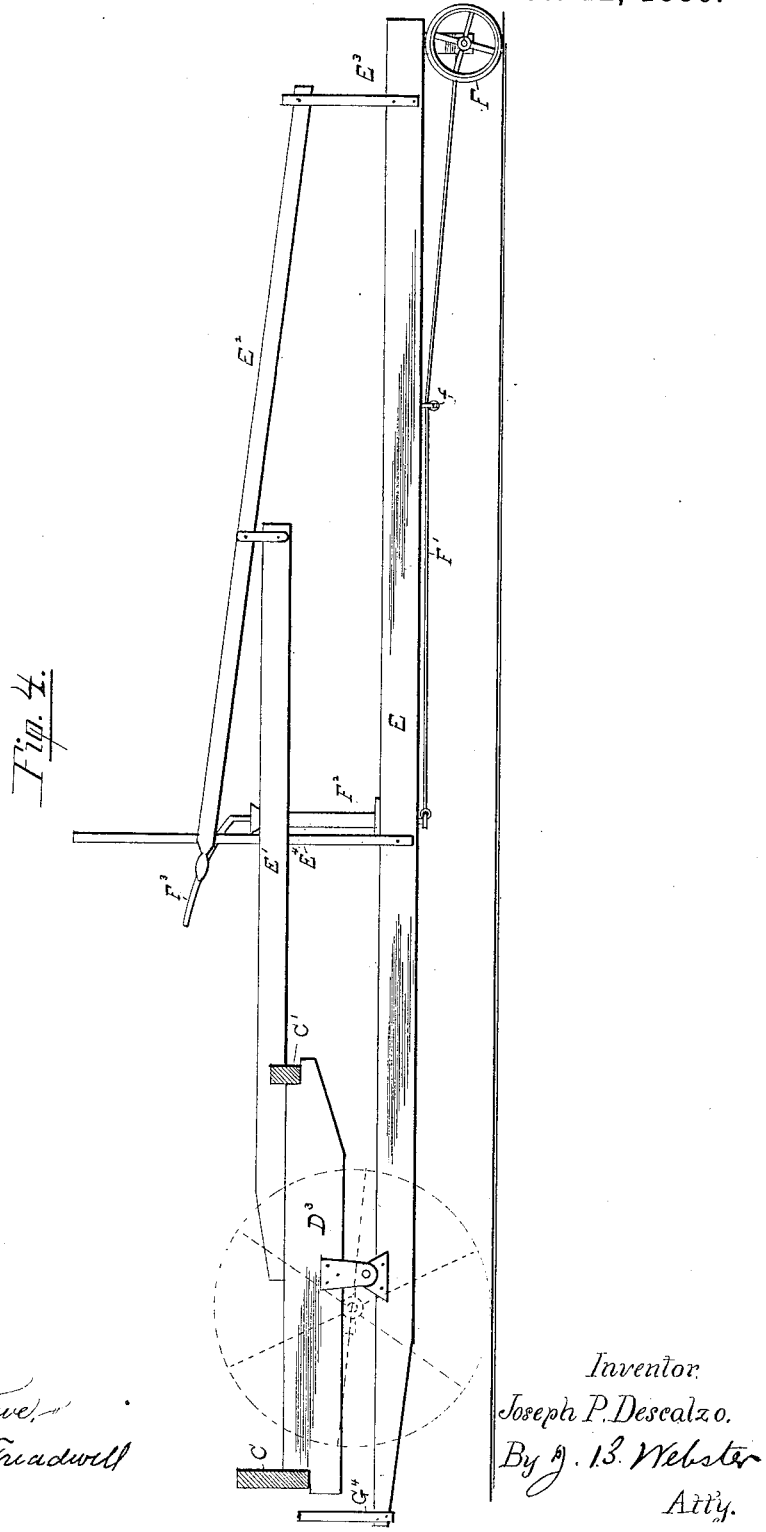

United States Patent Office.

JOSEPH P. DESCALZO, OF PETERS, CALIFORNIA.

COMBINED HARVESTER AND THRASHER.

SPECIFICATION forming part of Letters Patent No. 350,667, dated October 12, 1886.

Application filed March 14, 1885. Serial No. 158,804. (No model.)

*To all whom it may concern:*

Be it known that I, JOSEPH P. DESCALZO, a citizen of the United States, residing at Peters, in the county of San Joaquin and State of California, have invented certain new and useful Improvements in a Combined Harvester and Thrasher, of which the following is a specification, reference being had therein to the accompanying drawings.

My invention relates to an improvement in combined harvesters and thrashers; and it consists, first, in a frame for the pushing portion, which is adapted to have the frame containing the wheels and having the thrashing mechanism placed upon it pivotally secured to it; secondly, in having the heading and conveying mechanism secured to the axle of the carrying-wheels; thirdly, in the manner of controlling the position of the thrasher by levers; fourthly, in the manner of controlling the position of the header by levers; fifthly, in the gearing, and, sixthly, in the combination and arrangement of devices that will be more fully set forth hereinafter, and particularly pointed out in the claims.

Figure 1:
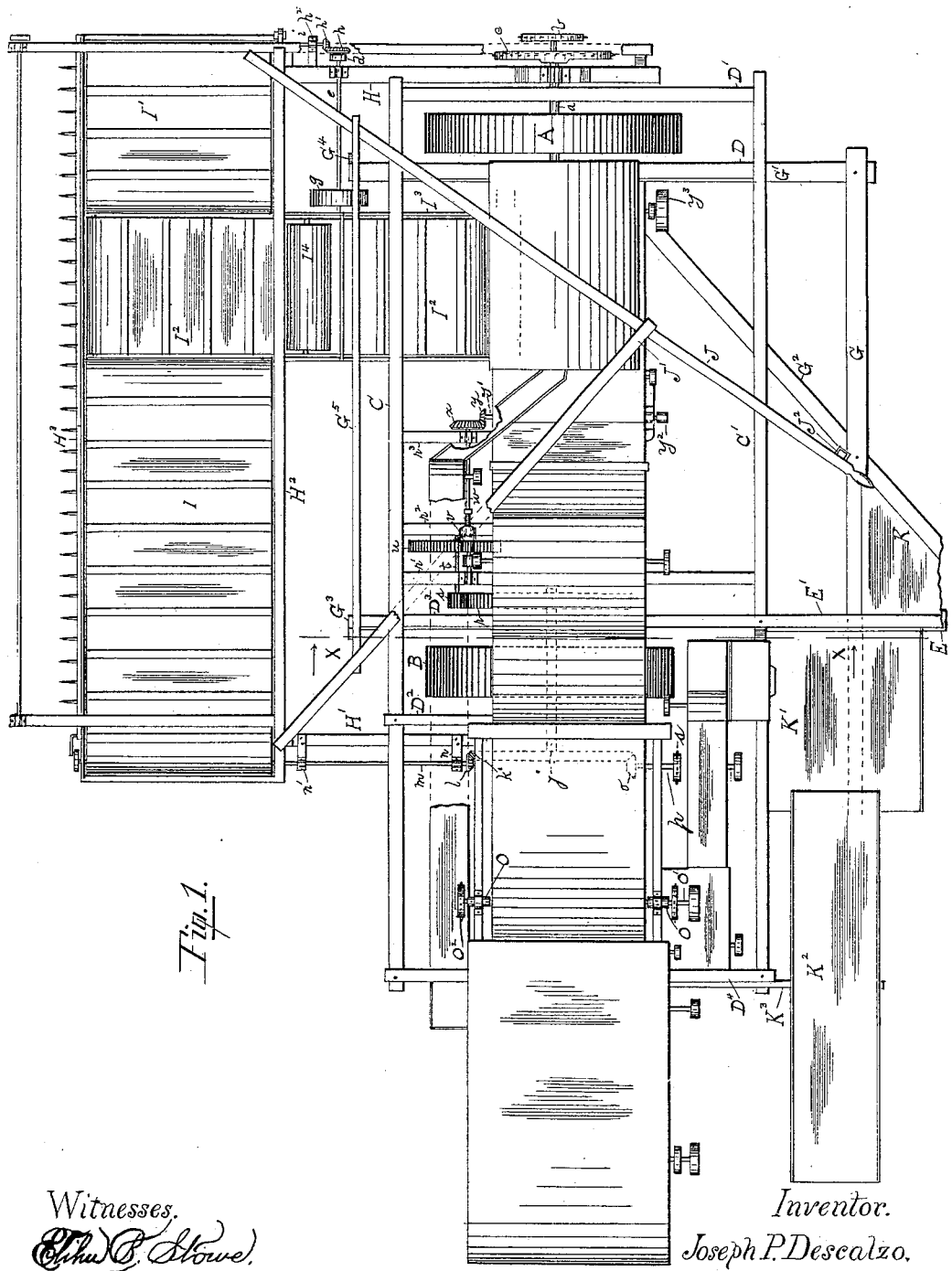
Figure 2:
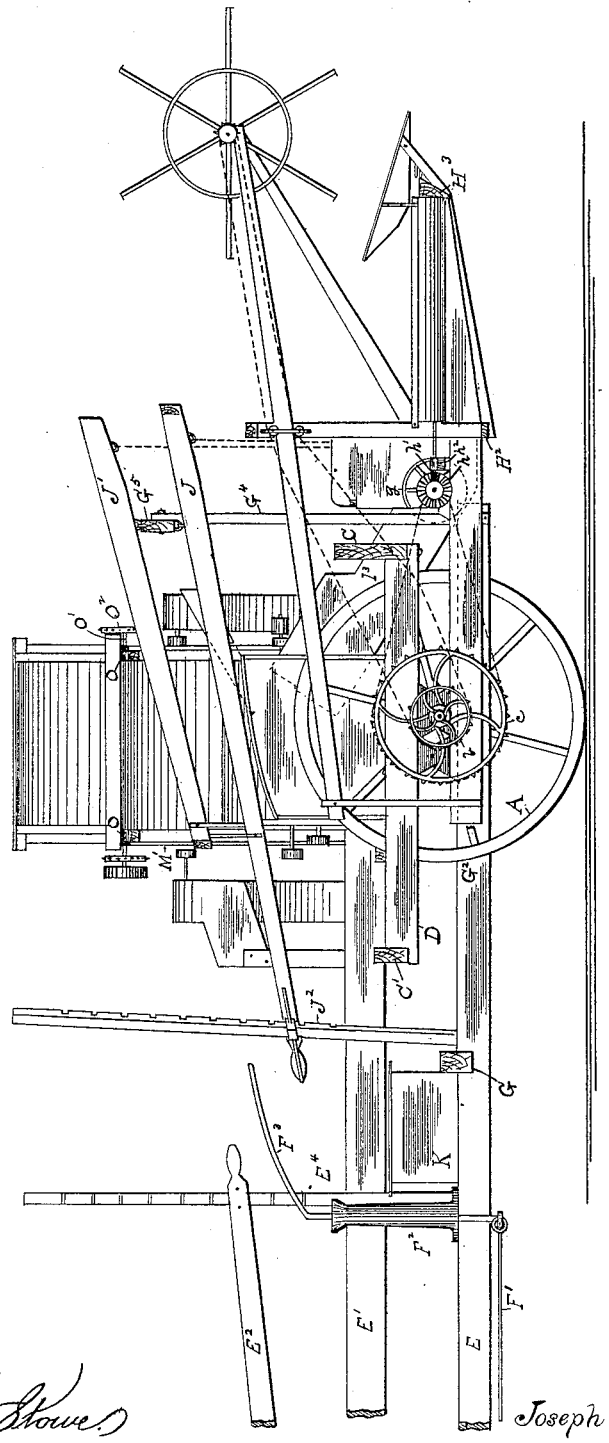

In the accompanying drawings, Figure 1 is a top plan view of my combined harvester and thrasher. Fig. 2 is a right-hand side elevation. Fig. 3 is a front view, partly in section, of the thrasher portion. Fig. 4 is a sectional view of pushing-pole and frame-work through line $x\,x$ of Fig. 1.

A is the right-hand carrying and driving wheel.

B is the left-hand carrying and driving wheel, being in line with each other.

C is the front cross-beam, and C' the back cross-beam.

D and D' are longitudinal beams attached at the right-hand ends of beams C and C'. The axle of the wheel A has its journal-bearings secured to the under sides of the beams D and D'.

$D^2$ and $D^3$ are longitudinal beams attached at the left hand of the center beams, C and C'. The axle of the wheel B has its journal-bearings secured to the under sides of the beams $D^2$ and $D^3$. A beam, $D^4$, is attached to the left-hand ends of the beams C and C'. The beam $D^5$ is hinged to the pushing-pole E near the latter's front end and a little in the rear of the axle of the wheel B. A lever, E', is rigidly attached to the rear end of the beam $D^3$, which lever E', at its rear, is flexibly attached to a hand-lever, $E^2$, having its foot flexibly attached to a vertical post, $E^3$, at rear of pole E, and its handle engaging with vertical post $E^4$, attached at the center of pole E. A tiller-wheel, F, supports the rear of pole E, and has forwardly-extending connecting-rods F', working over rollers $f$ beneath pole E, connected to the cranked handle $F^3$ of a hollow tiller-post, $F^2$, attached to pole E near post $E^4$. The horses are attached to pole E, and are guided by the operator, who also steers the machine and controls the adjustment of the thrasher by means of the above-described construction.

To the forward end of pole E is attached a beam, G, and at right angles to beam G, at its right-hand end, is attached a beam, G'. A diagonal brace, $G^2$, connects pole E and beams G and G'. At the forward end of pole E and beam G are vertical posts $G^3$ and $G^4$, respectively, which are guided together at their tops by cross-beam $G^5$, which acts as a fulcrum for the levers of the header, as will be shown. The beam G' hinges to beam D the same as pole E does to beam $D^3$.

The thrasher is attached to beams D D' $D^2$ $D^3$ $D^4$ and cross-beams C and C'. Beams H, right-hand, H', left-hand, are hinged at their rear ends to axles of wheels A and B, respectively, and extending forward suspend the header, $H^2$ being rear cross-beam and $H^3$ being front cross-beam containing the sickle and guards, and having running between them left-hand draper, I, and right-hand draper, I', which two drapers, conveying to a center, deliver the straw upon a center-feeding draper, $I^2$, which runs also rearward in a spout, $I^3$, attached to rear of beam $H^2$, which spout $I^3$ contains a roller, $I^4$, the purpose of which is to keep the straw snugly upon the draper $I^2$, which delivers the straw upon a self-feeder of the cylinder. Right-hand lever, J, and left-hand lever, J', are attached at their front ends by chains to beam $H^2$ and have their common fulcrum, as shown, on cross-beam $G^5$ at tops of posts $G^3$ $G^4$, being connected to each other and to beam $G^5$ by iron straps. Lever J, at its rear end, is provided with a handle, which engages with post $J^2$, seated on beam $G^2$. A raised platform, K, attached to pole E and beams G and $G^2$, affords a standing-place for the operator, who has the handles of tiller F², lever E², and lever J within his reach, and controls the various movements of the machine, governed by their respective operating mechanisms.

Platform K', for the sack-carrier, is attached to the pole E and beams G' and G, alongside of and to the left of platform K. The grain from the cleaner discharges into the sacks placed upon the platform K'. A platform, K², is hinged to beam D⁴, alongside of and to the left of platform K'. The filled sacks are deposited upon platform K², and are discharged from the machine at will by means of the hinges of platform K².

The actuating mechanism of the header is derived from both the wheels, A and B. To the right-hand end of the axle $a$ of the wheel A is affixed a sprocket-wheel, $b$, from which, by a connecting chain-belt, the reel derives its motion. Just inside of wheel $b$ is a sprocket-wheel, $c$, connected by belt with sprocket-wheel $d$ on a shaft, $e$, located on beam H and spout I³. On shaft $e$, near spout I³, is fixed a pulley, $g$, which may be connected with a notched pulley and actuates the feeding-draper I². On right-hand end of shaft $e$ is a bevel-gear, $h$, engaging with a bevel-pinion, $h'$, on end of a shaft, $i$, which is seated on beam H³ and on a support, $h^2$, bolted to beam H. This shaft $i$ has a roller upon it, and actuates draper I'. The wheel B has axle $j$, having affixed to it bevel gear-wheel $k$, which engages with bevel-pinion $l$ on shaft $m$, which, seated on supports $n$ and $n'$, bolted to beam H', has its forward bearing on beam H³, and actuates draper I and the sickle by appropriate connecting mechanism. The gear K also engages with a pinion, $o$, on shaft $p$, which has a sprocket-wheel, $o'$, at its rear end, from which by connecting-belts is actuated the various parts of the separator. Shaft $j$ has also gear-wheel $r$ affixed to it, which engages with pinion $s'$, affixed to shaft $t$, which is seated on timbers $r'$ and $r^2$, attached to beam C and sill of the thrasher. On shaft $t$ is affixed gear-wheel $u$, engaging with pinion $v$ on shaft $w$, secured to beams $r'$ and $r^3$. Shaft $w$ also has affixed to it a bevel-pinion, $x$, which engages with cylinder-pinion $y$ on the front end of cylinder-shaft $y'$, which has a pulley, $y^2$, which may be connected by belt with pulley $y^3$ on end of shaft, actuating a self-feeder in front of cylinder.

I have not described any of the features which appertain particularly to the thrasher, as they will be made the subject-matter of another application.

I have only partially described and shown the gearing, belting, &c., as such are common and well known. Therefore there is no occasion to describe them.

I do not desire to limit myself to the precise construction and arrangement of parts, as hereinbefore set forth, as it is obvious that many modifications may be made therein without departing from the spirit of my invention.

Having thus described my invention, I claim—

1. A frame adapted for a combined heading and thrashing machine, consisting of the transverse beams C C', longitudinal beams D D', attached at right-hand ends of beams C C', longitudinal beams D² D³, attached at the left hand of the center of beams C C', and beam D⁴, attached at left-hand ends of the beams C C', in combination with suitable supporting and driving wheels, A B, substantially as described.

2. In a combined header and thrasher, the combination of the beams D³ and D⁴, attached, as shown, to the frame, the pole E, hinged to beam D³, the supporting and tiller wheel F at its rear beam, G', hinged to the beam D, and beam G, attached at the rear end of said beam G' and also to tongue E, substantially as specified.

3. In a combined header and thrasher, the combination of the pole E, hinged to the beam D³ of the frame, the beam G', hinged to beam D, beam G, attached to the pole E, and beam G' at right angles thereto, tiller-wheel F at the rear end of said pole, hollow post F², attached to said pole, a crank-shaft passing through said hollow post, and link F', connecting said crank-shaft and the tiller-wheel and passing over guide $f$, substantially as shown and described.

4. In a combined header and thrasher, the combination of the pole E, attached, as shown, to beam D³ of the frame, post F² and E⁴, lever E², engaging with said post E⁴, beam E', rigidly attached to rear end of beam D³, and the link connecting the lever E² and beam E', substantially as shown and described.

5. The pushing-frame of the machine, consisting of the pole E, attached to beam D³, the beam G', attached to beam D, the cross-beam G, and the diagonal brace G², the tiller-wheel F at the rear of pole E, and its controlling mechanism consisting of the rod F', guides $f$, post F², attached to pole E, and handle F³, connected by means of its shaft and cranks to rod F', all substantially as specified.

6. In a combined header and thrasher, the combination of the pushing-frame, constructed as described, and attached to the main frame, as shown, the posts G³ G⁴, attached at their feet to the pole E and beam G', respectively, cross-beam G⁵, connecting said posts, and the lever for adjusting the header-frame, substantially as shown and described.

7. In a combined header and thrasher, the combination of pole E, platform K, beams G G², post F², the crank-shaft having handle F³, post E⁴, lever E², engaging with said post, beam G², post J², attached to said beam, and lever J, engaging with said post, substantially as set forth.

8. In a combined header and thrasher, the combination of the beams G G', pole E, the platform K', and platform K², located at the left hand of K' and hinged to the rear end of beam D⁴, substantially as set forth.

9. In a combined header and thrasher, the combination of a frame composed of the transverse beams C C', longitudinal beams D D' D² D³ D⁴, pushing-pole E, and its frame-supporting wheel F, forwardly-extending beams H H', the header-beam H², connected thereto, the cutting apparatus and its actuating mechanism, the supporting and driving wheels, and connecting gearing consisting of the axles a, wheel b, wheel c, wheel d, shaft e, pulley g, gear h, pinion h', shaft i, shaft j, wheel k, pinion l, shaft m, gear k', pinion o, shaft p, wheel o', wheel r, pinion s, shaft t, wheel u, pinion v, shaft w, pinion x, pinion y, shaft y', pulley y², and pulley y³, all substantially as described.

10. The combination, in a header and thrasher, of the main frame, a conveyer-frame pivoted to the axles of the conveying and driving wheels, the actuating mechanism, the levers J J', mounted on a frame composed of posts G³ G⁴, and cross-beams G⁵, said levers extending rearwardly therefrom and engaging with post J² on beam G², and chains connecting the front ends of said levers to beam H², substantially as described.

11. In a combined header and thrasher, the combination of the post G³, attached to the forward end of pole E, the post G⁴, attached to the forward end of beam G', cross-beam G⁵ at their tops, levers J J', strapped together and fulcrumed on said beam, attaching-chains at their forward ends, beam H², post J², seated on beam G², the beam G', and pole E, flexibly attached to main frame of the thrasher, all substantially as set forth.

12. In a combined header and thrasher, the combination of the pole E, secured at its front end to beam D³, supporting tiller-wheel F at the rear end of said pole, lever E', rigidly attached to beam D³, posts E³ E⁴, lever E², flexibly attached to post E³, engaging with post E⁴, and flexible connection with the rear end of beam E', all as shown and set forth.

In testimony whereof I affix my signature in presence of two witnesses.

JOSEPH P. DESCALZO.

Witnesses:
JOSHUA B. WEBSTER,
ELIHU B. STOWE.